United States Patent Office 2,729,682
Patented Jan. 3, 1956

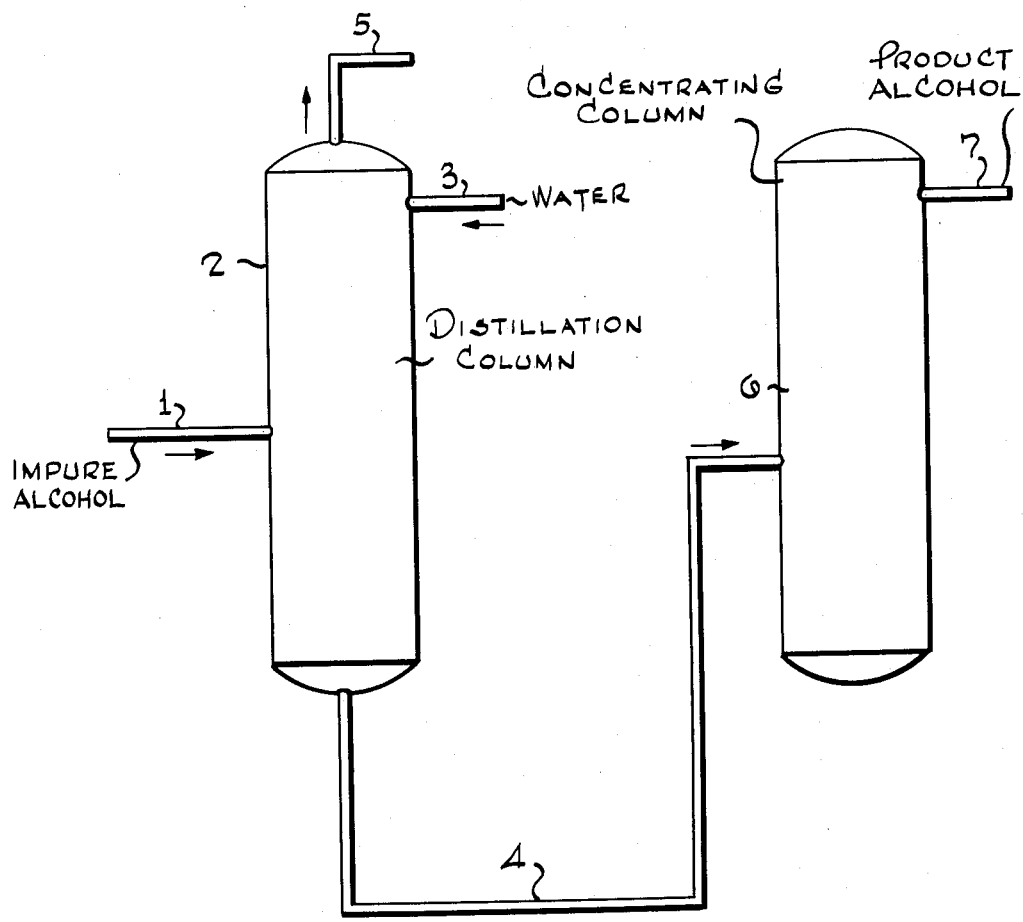

2,729,682

PREPARATION OF ISOPROPANOL OF IMPROVED ODOR QUALITY

Henry O. Mottern, Bloomfield, N. J., assignor to Esso Research and Engineering Company, a corporation of Delaware Application May 26, 1950, Serial No. 163,319

4 Claims. (Cl. 260—641)

This invention relates to a combination process for the production and purification of isopropyl alcohol and particularly to the production of an isopropyl alcohol of improved odor quality in high yields, i. e., about 95%. Specifically, the invention relates to a process whereby isopropyl alcohol is produced free of malodorous impurities of the mercaptan and thioaldehyde type. More particularly this invention is concerned with a novel process for the production of isopropanol free of the above-mentioned malodorous impurities comprising a combination of steps involving (1) the production of a crude isopropanol by the sulfuric acid catalyzed hydration of propylene containing about 0.2 to 5 wt. per cent, preferably 0.5 to 1 wt. per cent (based on total hydrocarbons) of hydrocarbons containing 4 to 6 carbon atoms per molecule, particularly $C_4$ hydrocarbons, said $C_4$-$C_6$ hydrocarbons consisting of at least 50 wt. per cent $C_4$-$C_6$ mono-olefins, and (2) the subsequent purification of the crude isopropanol by water extractive distillation.

It is well known that alcohols, particularly those produced by the acid-catalyzed hydration of olefin hydrocarbons, possess a distinct and apparently foreign odor, slightly penetrating and for the most part disagreeable. While no attempt will be made to definitely assign the disagreeable odor of alcohols prepared by olefin hydration to the presence of any one or combination of chemical compounds, it can be said with reasonable assurance that the odor of crude alcohol depends to a large extent on the quality of the olefin stream employed in the olefin hydration operation. Likewise, the odor of a refined alcohol depends to a large extent on the quality of the crude alcohol from which it is prepared.

Olefin hydrocarbons, such as those produced by the cracking of mineral oils, contain variable amounts of compounds having an obnoxious odor particularly sulfur compounds such as hydrogen sulfide, alkyl sulfides and mercaptans. These materials present, even in minute amounts, in the olefin stream to the acid catalyzed hydration process are believed to contribute to the obnoxious odor of the crude alcohol, since, while sulfur alone has no smell, it is clear that in combination with other elements it is a powerful odoriferous agent. The bad odor of alcohols has also been attributed to the presence of so-called high-boiling polymer products formed in side reactions during the alcohol process. The odor of the polymer products is strengthened by the presence of any sulfur compounds dissolved therein, although the odor of some of the pure polymers themselves is by no means pleasing to the olfactory sense. A typical analysis of a sample of the so-called polymer product, in this case the so-called propyl oil, resulting from the production of isopropyl alcohol by the sulfuric acid catalyzed hydration of propylene, is as follows:

55 wt. per cent sec-heptanol (B. P. 137–140° C.)
21 wt. per cent sec-octanol (B. P. 160–165° C.)
2 wt. per cent $C_7$ ketone (B. P. 131° C.)
13 wt. per cent hydrocarbons (B. P. above 180° C.)
9 wt. per cent ethers (B. P. above 160° C.)
traces of sulfur compounds.

The composition of the propyl oil or so-called high-boiling polymers obtained during the concentration of dilute crude isopropanol varies according to the point from which the alcohol containing it is withdrawn in the concentrating tower, and the odor likewise varies. Cuts can be identified with an odor of camphor, of menthol, etc. It has been reported also that the presence of nitrogen compounds likewise contributes to the odor of alcohols.

The odor imparted to isopropyl alcohol by the propyl oil impuritiles is a "hydrocarbon" type odor, sometimes referred to as "butyl odor." This type of odor has been found to be effectively removed by a number of methods such as by careful and repeated conventional fractionations, but particularly by the water extractive distillation method as described and claimed in Serial No. 24,626 filed May 1, 1948, now U. S. Patent No. 2,638,440, in the name of William M. Drout, Jr. et al., and assigned to applicant's assignee.

However, there is a second type of odor which is fugitive in nature and which may best be characterized as a "mercaptan" or "thioaldehyde" odor, and which is attributed to the presence of low-boiling sulfur compounds such as mercaptans or thioaldehydes which appear to be decomposition products of higher-boiling impurities which break up under alcohol purification distillation conditions. It has been found that this second type of odor is particularly noticeable when the alcohol production process is operated under upset regenerator conditions or when the purification process is operated under upset concentrator conditions. When the capacity of the regenerator or concentrator is exceeded some isopropyl alcohol creeps down into the reboiler associated with the regenerator or concentrator wherein a high temperature prevails and where a particular concentration of sulfuric acid exists. Under these conditions it is felt that the sulfuric acid present in the reboiler acts as a reducing agent on the isopropyl alcohol which decomposes into lower-boiling impurities, particularly mercaptan and/or thioaldehyde compounds which are volatile. These impurities go overhead with the alcohol from the regenerator. Subsequently, in the concentrator they are not all removed with the low-boiling overhead, but remain in traces of parts per million in the isopropyl alcohol product which is removed as a top sidestream from the concentrator. Likewise, if the concentrator conditions are upset, the same decomposition occurs and the problem becomes aggravated. It has also been theorized that this second type of odor is due to the decomposition of sulfurized esters which are formed in minute amounts during the propylene absorption in sulfuric acid. These esters are thought to decompose either thermally or by hydrolysis. In commercial operations this type of odor has been termed "recycle odor" although the odor is in no way attributable to recycle operations encountered in the production of isopropanol.

Furthermore, there are indications that some of the compounds giving rise to "mercaptan" odor are rather strongly bound in the aqueous alcohol product in such a manner that they tend to concentrate along with the alcohol during such operations as heads removal, water extractive distillation and even regular distillation for alcohols finishing. However, the nature of the chemical reactions tending to bind these malodorous compounds is such that unstable addition compounds result and the malodorous compounds are liberated and volatilized to some extent during all alcohol finishing operations of the types described. For instance, in typical alcohol finishing operations the following problems are encountered. Crude alcohol, after passing through the heads operation to remove ether and other low boilers, is fed to a finishing column in which certain low-boiling materials are taken overhead with a purified alcohol taken as a sidestream.

Materials contributing to "recycle odor" appear to be lower boiling than the alcohol proper but are nevertheless not completely removed from the alcohol sidestream. This result is believed to be due in large part to the fact that decomposition reactions liberating low-boiling malodorous compounds occur during the distillation, allowing these malodorous compounds to pass overhead. Similar difficulties are encountered when applying water extractive distillation to the same crude alcohol. In fact, water extractive distillation appears to concentrate the compounds giving rise to mercaptan odor along with the alcohol so that, in the final alcohol finishing operation, an alcohol product high in mercaptan odor is obtained. This seems to be particularly true of isopropyl alcohol prepared by the so-called weak acid method as described below.

Crude isopropyl alcohol is produced by the sulfuric acid catalyzed hydration of propylene by the weak acid method or the strong acid method. In the former process a relatively clean $C_3$-hydrocarbon stream containing about 50–80 volume percent propylene is absorbed in sulfuric acid. The relatively clean $C_3$-hydrocarbon stream is a product of the careful fractionation of a refinery $C_3$-stream so that it contains only traces to a maximum below 0.2 wt. percent of $C_4$-olefins plus $C_4$-paraffins. Acid of approximately 60 to 80 wt. percent concentrations, preferably 70 wt. percent, is employed at about 170° F. and approximately 250 p. s. i. g. pressure to form an extract comprising isopropyl sulfate which is partially hydrolyzed to alcohol during the absorption. The hydrolysis is completed by dilution of the extract with water to approximately 45 wt. percent acid strength and maintaining the extract at a temperature of about 190° F. for a period of about 10 minutes residence time. The hydrolysis products are then distilled in an alcohol regenerator wherein crude alcohol vapors are removed overhead and condensed, and wherein spent sulfuric acid is recovered as bottoms for reconcentration and subsequent re-use in the absorption process. The crude isopropyl alcohol contains approximately 30–60% by volume of isopropyl alcohol, some impurities including hydrocarbons, isopropyl ether, acetone and unknown impurities, and the balance water. The crude alcohol is condensed and cooled and is ready for the purification stage of the process.

In the strong acid process a propylene stream of relatively lower propylene content, i. e., about 30–60 volume percent propylene is contacted under similar conditions with a stronger sulfuric acid, e. g., acid of 80–95 wt. percent concentration, preferably 85–88 wt. percent, whereby an extract is formed as above. The extract goes through a similar hydrolysis and stripping treatment to produce a crude isopropyl alcohol as described for the weak acid process.

When the isopropyl alcohol is purified by conventional fractionation it is led to a heads column the purpose of which is to remove ether and other low-boiling water-insoluble impurities, such as hydrocarbons, hydrocarbon polymers, oxygenated compounds, and unknown impurities. This is accomplished by a steam stripping operation whereby the lighter materials are withdrawn overhead while weak aqueous alcohol is recovered as bottoms. The weak aqueous alcohol is then distilled in a concentrating column where the alcohol is concentrated to a composition approaching its water azeotrope, viz., 91 vol. percent isopropyl alcohol—9 vol. percent water. The alcohol of azeotropic composition may be further distilled for removal of acetone, if present, or concentrated further to 95 vol. percent or 99 vol. percent isopropyl alcohol, if desired.

When the crude isopropyl alcohol is being purified by extractive distillation, the crude alcohol is distilled countercurrent to an internal water reflux containing 70–99 mol percent water, preferably 80–95 mol percent, whereby the low-boiling impurities both water-soluble and water-insoluble and some of the high-boiling impurities are removed overhead, while a dilute aqueous solution of the alcohol is recovered as bottoms and sent to a concentrating column where azeotropic alcohol is separated as a top sidestream from the balance of the high-boiling impurities and water.

It has been the practice in the commercial manufacture of isopropanol to employ propane-propylene mixed gases which have been fractionated to remove all the $C_4$ and higher hydrocarbons (down to a maximum below 0.2 wt. percent) including paraffins both normal and iso, and olefins both mono- and di-olefins. This procedure was adopted in order to minimize the amount of hydrocarbon-type impurities giving rise to "butyl odor" in the resulting alcohol, which impurities were not all removable by the conventional distillation processes employed to purify the crude alcohol. With the advent of the application of extractive distillation employing water as a solvent to the purification of aliphatic alcohols, and particularly isopropanol, it was found that these hydrocarbon-type impurities were completely removed and odors arising therefrom eliminated from the alcohol, and at the same time extremely high yields of isopropanol (95% and above) were obtained. However, water extractive distillation, although highly effective for the recovery in high yields of isopropanol free of malodorous impurities giving rise to hydrocarbon-type or "butyl odor," is ineffective for the complete removal from isopropanol of those light-boiling sulfur-bearing materials giving rise to "mercaptan" or "recycle" odor. Nor is the latter type odor removed by repeated distillations of the isopropanol.

It has been found that "mercaptan" type or "recycle" odor may be destroyed and isopropanol produced in high yields by incorporating into the propylene stream to the sulfuric acid absorption operation 0.2 or 0.5 to 5 wt. per cent of a $C_4$ to $C_6$ mono-olefin, preferably about 0.2 to 1.0 wt. per cent of a $C_4$-mono-olefin, based on the weight of the total hydrocarbon in the gas. It is believed that the $C_4$ to $C_6$ mono-olefin reacts with the low-boiling, low molecular weight mercaptans, thioaldehydes or the thio-ketones or other sulfur-bearing compounds converting them to higher molecular weight materials which more closely resemble the hydrocarbon-type impurities giving rise to "butyl odor," and which are removed completely by water extractive distillation.

It is believed that "recycle odor" has its genesis in the formation of $H_2S$ by the reaction of sulfuric acid with propylene. Hydrogen sulfide then enters into a series of reactions producing low-boiling sulfur-containing compounds. The mechanism of the reactions is postulated as follows:

$$H_2SO_4 + C_3H_6 \longrightarrow H_2S, \text{etc.}$$

$$H_2S + C_3H_6 \longrightarrow CH_3-CH-SH-CH_3$$

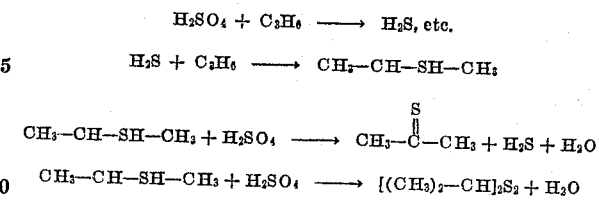

These reactions become manifold forming many sulfur-containing compounds capable of causing odor in alcohol.

By having $C_4$ olefins present these reactions are not stopped. Rather they become more rapid with the formation of higher boiling sulfur compounds which then are capable of being segregated by extractive distillation from the alcohol, e. g.,

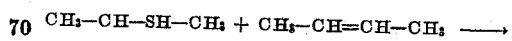

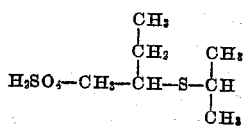

or

CH₃CH₂—CH—SH—CH₃ + CH₃—C—CH₃ ⟶
                              ‖
                              S

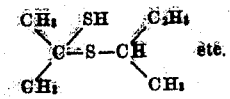

etc.

In the purification of the crude isopropanol by water extractive distillation the procedure described in the above mentioned Serial No. 24,626 is employed. The method therein described for purifying isopropanol is summarized as follows in accordance with the flow diagram shown in the drawing:

The crude isopropanol containing high boiling and low boiling impurities is subjected to a distillation operation in which the crude alcohol is fed through line 1 to a distillation tower 2 at a point below the top, preferably at about the mid-point of the tower, and in which water is fed through line 3 to the top of the tower or at a point near the top thereof in sufficient quantity to maintain a composition of 70 to 99 mol. per cent water in the liquid phase in the column. These concentrations correspond to approximately 35–96 vol. per cent water, preferably 55–96 vol. per cent. The water thus supplied is sufficient to establish relative volatility relationships whereby there is removed overhead through line 5 from the distillation tower all or substantially all of the impurities contained in the crude alcohol, namely, the low boiling impurities and the high boiling impurities. Among the impurities are light boiling hydrocarbons, some of which boil as low as 30° C. In addition the higher boiling impurities comprising the so-called "propyl oils" or "polymer oils" boiling as high as 250° C. to 300° C. are removed overhead. The dilute aqueous isopropanol product obtained through line 4 as bottoms from the distillation, and containing preferably 15–25 vol. per cent isopropanol, is led to a concentrating column 6 wherein the isopropanol is concentrated and recovered in high yields through line 7.

The effect of the presence of the $C_4$ to $C_6$ mono-olefins on the elimination of "mercaptan" or "recycle" odor from isopropanol is reflected in the following examples.

Example 1

A propane-propylene refinery stream containing traces to 0.2 wt. per cent (maximum) of $C_4$-hydrocarbons including mono-olefins was contacted with 65–70 wt. per cent $H_2SO_4$ at temperatures of 70–80° C. in the manner previously outlined for the weak-acid process. The crude isopropanol was refined by both the conventional distillation procedure and by water extractive distillation. The refined alcohols in both cases were characterized by the presence of "recycle odor" rendering them unsaleable for many purposes, such as solvents, etc.

Example 2

A propane-propylene refinery stream from a cracking operation containing 1–5 wt. per cent of $C_4$ compounds including 0.5 to 2 wt. per cent mono-olefins was contacted with $H_2SO_4$ of approximately 70 wt. per cent strength at a temperature of about 70° C. in the same manner as in Example 1. The crude alcohol was purified by water extractive distillation and a product having neither "recycle odor" nor "butyl odor" was prepared in superior yields.

Example 3

The following data illustrate the process of the invention as applied to a crude isopropanol prepared by absorbing a propylene stream in sulfuric acid of 70 wt. per cent strength followed by extractive distillation of the product employing water as the extractive solvent. The data show that the propylene stream free of $C_4$-hydrocarbons resulted in a final alcohol product which was characterized by the presence of "recycle odor," whereas a feed containing 0.36 wt. per cent $C_4$-hydrocarbons produced a crude alcohol which when purified by water extractive distillation yielded a prime crude alcohol with no "recycle odor."

| Run No. | 2 | 3 |
|---|---|---|
| Production Rate, gal./S. D | 45,873 | 27,800 |
| Odor rating | Prime (no recycle odor) | Regular (recycle odor) |
| Wt. percent $C_4$ in $C_3$ stream | .36 | 0 |
| Extractive Column Operation: | | |
| Crude Alcohol feed rate, G. P. H | 3,580 | 2,060 |
| Water feed to column, G. P. H | 4,330 | 5,379 |
| Extractive Products: | | |
| Vol. percent Ether in overhead | 80.0 | 40.0 |
| Vol. percent Alcohol in overhead | 1.0 | 11.0 |
| Vol. percent Alcohol in Water Extract Bottoms | 22.0 | 16.0 |
| Finishing Column: | | |
| Feed rate, G. P. H | 8,500 | 8,000 |
| Sidestream rate, G. P. H | 345 | 110 |
| Reflux rate, G. P. H | 8,500 | 7,800 |
| Steam rate, G. P. H | 32,000 | 28,000 |

Example 4

The following runs were carried out on crude alcohol prepared by absorbing a propylene stream in an acid of 75 wt. percent strength. The propylene stream contained 0.26 wt. percent of $C_4$ hydrocarbons. The resulting crude isopropanol was purified by water extractive distillation and an alcohol of prime grade free of "recycle odor" was obtained.

| | | |
|---|---|---|
| Production Rate, G. P. H | 1,612 | 2,380 |
| Odor rating | Prime (no recycle odor) | Prime (no recycle odor) |
| Wt. percent $C_4$ in $C_3$ stream | 0.26 | 0.26 |
| Extractive Column Operation: | | |
| Crude Alcohol feed, G. P. H | 968 | 1,108 |
| Water feed to column, G. P. H | 720 | 1,320 |
| Extractive Products: | | |
| Vol. percent Ether in overhead | 37.1 | 29.8 |
| Vol. percent Alcohol in Water Extract Bottoms | 31.1 | 24.8 |

Having described the invention in a manner so that it may be practiced by those skilled in the art what is claimed is:

1. In a process of producing isopropanol by hydration of a propylene hydrocarbon feed which contains impurities normally giving rise to mercaptan odor and also contains less than 0.2 percent of $C_4$ to $C_6$ mono-olefinic hydrocarbons, the improvement of minimizing mercaptan odor which comprises adding to said propylene feed enough of a $C_4$ to $C_6$ mono-olefinic hydrocarbon to produce a modified propylene feed containing 0.5 to 5 weight percent of said $C_4$ to $C_6$ mono-olefinic hydrocarbon, absorbing said modified propylene feed in sulfuric acid of 60 to 95 weight percent strength to produce an acid extract, hydrolyzing the extract to produce crude isopropanol containing low boiling impurities and simultaneously reacting the $C_4$–$C_6$ olefin with the odor-causing impurities to convert them to high boiling impurities boiling as high as 250–300° C., introducing the crude isopropanol into a point near the mid-section of a distillation zone, introducing water to an upper portion of the distillation zone in amounts sufficient to maintain a water concentration of 70 to 99 mol percent in the liquid phase in the distillation zone, applying heat to the distillation zone to distill therefrom vapors which rise countercurrently to the downflowing aqueous reflux, removing overhead from the distillation zone low-boiling and high-boiling impurities including impurities normally giving rise to mercaptan odor and removing from the bottom of said distillation zone a dilute aqueous isopropanol substantially free of mercaptan odor.

2. A process according to claim 1 in which the water concentration in the distillation zone is maintained in the range of 80 to 95 mol percent.

3. A process according to claim 1 in which the water is removed from the dilute isopropanol by concentration in a stripping zone.

4. The process of claim 1 in which the $C_4$–$C_6$ olefinic hydrocarbon is a $C_4$-mono-olefin in an amount of about 0.5 to 1.0 weight per cent.

References Cited in the file of this patent

UNITED STATES PATENTS

| | | |
|---|---|---|
| 2,081,111 | Bump | May 11, 1937 |
| 2,196,177 | Burk et al. | Apr. 9, 1940 |
| 2,290,442 | Metzl | July 21, 1942 |
| 2,510,806 | Egberts et al. | June 6, 1950 |
| 2,551,593 | Gilliland et al. | May 8, 1951 |
| 2,586,602 | Beddow | Feb. 19, 1952 |
| 2,610,141 | Drout, Jr. | Sept. 9, 1952 |

FOREIGN PATENTS

| | | |
|---|---|---|
| 598,346 | Great Britain | Jan. 28, 1940 |